United States Patent
Tsai et al.

(10) Patent No.: US 10,718,332 B2
(45) Date of Patent: Jul. 21, 2020

(54) WATER LUBRICATION AIR COMPRESSION SYSTEM

(71) Applicant: FU SHENG INDUSTRIAL CO., LTD., Taipei (TW)

(72) Inventors: Min-Jen Tsai, Kinmen County (TW); Feng-Yung Lin, New Taipei (TW); Chih-Lung Tseng, Taipei (TW)

(73) Assignee: FU SHENG INDUSTRIAL CO., LTD., Taipei (TW)

( * ) Notice: Subject to any disclaimer, the term of this patent is extended or adjusted under 35 U.S.C. 154(b) by 295 days.

(21) Appl. No.: 15/891,325

(22) Filed: Feb. 7, 2018

(65) Prior Publication Data

US 2019/0032663 A1 Jan. 31, 2019

(30) Foreign Application Priority Data

Jul. 31, 2017 (TW) .............................. 106125653 A

(51) Int. Cl.
*F01C 1/16* (2006.01)
*F03C 2/00* (2006.01)
(Continued)

(52) U.S. Cl.
CPC ...... *F04C 29/0007* (2013.01); *B01D 46/4272* (2013.01); *C02F 1/441* (2013.01);
(Continued)

(58) Field of Classification Search
CPC ...... F04C 18/107; F04C 18/16; F04C 27/009; F04C 29/0007; F04C 29/0085; F04C 29/021; F04C 29/025; F04C 29/026; F04C 29/04; F04C 2210/1005; F04C 2210/147; C02F 1/441; B01D 46/4272;
(Continued)

(56) References Cited

U.S. PATENT DOCUMENTS 8,529,234 B2 * 9/2013 Yoshimura .............. F04C 27/02
418/98
2012/0164015 A1 6/2012 Yoshimura
(Continued)

FOREIGN PATENT DOCUMENTS

CN 2544793 Y 4/2003
CN 105604945 A 5/2016
(Continued)

*Primary Examiner* — Theresa Trieu
(74) *Attorney, Agent, or Firm* — Winston Hsu

(57) ABSTRACT

A water lubrication air compression system disposes an lubricant heat dissipation system at a bearing chamber close to the high pressure end of the compressor for cooling and circulating lubricant due to the rise of temperature during operation of the compressor, hence enhancing the ability and stability of the compressor. On the other hand, a negative pressure system is connected to the air chambers between the oil lubrication and the water lubrication of the compressor in order to provide a negative pressure. If any leak of water vapor at the compressor chamber or oil vapor at the bearing chamber, the negative pressure system is able to produce a negative pressured condition toward the sealing structure so that the oil lubrication can be effectively isolated from the water lubrication and inter-contamination between the lubricant and water can be avoided.

6 Claims, 2 Drawing Sheets

(51) Int. Cl.
*F03C 4/00* (2006.01)
*F04C 2/00* (2006.01)
*F04C 29/00* (2006.01)
*F04C 27/00* (2006.01)
*F04C 29/02* (2006.01)
*F04C 29/04* (2006.01)
*F04C 18/16* (2006.01)
*B01D 46/42* (2006.01)
*C02F 1/44* (2006.01)
*C02F 5/00* (2006.01)
*F04C 18/107* (2006.01)

(52) U.S. Cl.
CPC .............. *C02F 5/00* (2013.01); *F04C 18/107* (2013.01); *F04C 18/16* (2013.01); *F04C 27/009* (2013.01); *F04C 29/0085* (2013.01); *F04C 29/021* (2013.01); *F04C 29/025* (2013.01); *F04C 29/026* (2013.01); *F04C 29/04* (2013.01); *F04C 2210/1005* (2013.01); *F04C 2210/147* (2013.01)

(58) Field of Classification Search
CPC ........ B01D 35/147; F01M 1/10; F01M 11/03; F16H 57/0497; F16N 27/005; F16N 2270/00; F16N 2270/60; F16N 2280/00

USPC ................. 418/83, 88–89, 201.1–201.3, 270; 184/6.16, 6.24, 7.3
See application file for complete search history.

(56) References Cited

U.S. PATENT DOCUMENTS

2014/0308148 A1 10/2014 Takeda
2017/0082108 A1 3/2017 Tsai
2017/0306959 A1* 10/2017 Yano ..................... F04C 27/009
                                                                    418/104

FOREIGN PATENT DOCUMENTS

| | | |
|---|---|---|
| CN | 206175227 U | 5/2017 |
| TW | M515035 U | 1/2016 |
| TW | 201623802 A | 7/2016 |
| WO | 01/51813 A1 | 7/2001 |
| WO | 2005/038258 A1 | 4/2005 |
| WO | 2013/028015 A2 | 2/2013 |
| WO | 2013/175817 A1 | 11/2013 |
| WO | 2016/052297 A1 | 4/2016 |

* cited by examiner

WATER LUBRICATION AIR COMPRESSION SYSTEM

BACKGROUND OF THE INVENTION

1. Field of the Invention

The invention relates to an air compression system, and more particularly, to a water lubrication air compression system.

2. Description of the Prior Art

Based on the lubrication properties, a compressor of prior art may be categorized into an oil lubrication compressor and an oil free compressor. The lubricant of the oil lubrication compressor not only effects lubrication and sealing but also forms a lubricant film between the spiral rotors and between the spiral rotors and the compression chamber, where the lubricant film avoids metal surface wearing and leakage of pressurized air and further absorbs heat arising from the compression operation. Thus, a compressor may work with enhanced compression efficiency and lowered working temperature.

After air enters the sealed compression chamber, the lubricant adheres to the spiral rotors and the compression chamber for lubrication and sealing as the compression is activated.

There is also a water lubrication double screw type of compressor, which includes no oil in the structure of the compression chamber, meaning that the compression operation is oil free so that it is free of inter-contamination between the oil vapor and the compressed air. Nonetheless, the above double screw design results in a large sized platform that suggests a prominent working temperature rise in the synchronous gears, which causes problems of overheated lubricant and heat accumulation in the adjacent bearing chamber.

Also, after long term compressor operation, shaft seals in the compression chamber fatigues, giving rise to water vapor leakage. Leaking into the air chambers, the water vapor may further penetrate into the bearing chamber through the lubrication oil seals and emulsify the lubricant therein so that the lubricity worsens.

SUMMARY OF THE INVENTION

The objective of the invention is to provide a water lubrication air compression system which cools down and maintains stability of the oil lubrication system and further prevents any leakage at the sealing structure.

To achieve the objective above, the embodiment of the invention provides a water lubrication air compression system which includes a compressor, an air channel system, a water channel system, a lubricant channel system, and a negative pressure system. The compressor includes an inlet end, an outlet end, a compression chamber, a first bearing chamber, a second bearing chamber, a first air chamber between the first bearing chamber and the compression chamber, and a second air chamber between the second bearing chamber and the compression chamber. The air channel system is connected between the inlet end and the outlet end of the compressor and includes a water vapor isolation device connected to the outlet end of the compressor and provides communication between the inlet end of the compressor and the outlet end of the compressor. The water channel system provides communication between an external water source and the inlet end of the compressor. The lubricant channel system is connected to the second bearing chamber where a lubricant in the second bearing chamber is circulated in the lubricant channel system. The negative pressure system is connected to the first air chamber and the second air chamber to provide a negative pressure for the first air chamber and the second air chamber.

In the water lubrication air compression system provided by the invention, the first bearing chamber includes a first oil seal and the second bearing chamber includes a second oil seal. The compressor includes a first sealing device at a side of the compression chamber adjacent to the first air chamber and the first bearing chamber. The compressor also includes a second sealing device at a side of the compression chamber adjacent to the second air chamber and the second bearing chamber.

In the water lubrication air compression system provided by the invention, the second bearing chamber includes a lubricant inlet and a lubricant outlet. The lubricant channel system includes a lubricant pump, a lubricant cooler, and a lubricant filter. The lubricant pump is connected to the lubricant outlet of the second bearing chamber. The lubricant cooler is connected to the lubricant pump. The lubricant filter is connected to the lubricant cooler and the lubricant inlet of the second bearing chamber. The lubricant in the second bearing chamber is pumped out of the lubricant outlet by the lubricant pump, cooled by the lubricant cooler, and filtered by the lubricant filter before entering the second bearing chamber through the lubricant inlet.

In the water lubrication air compression system provided by the invention, the negative pressure system includes a blower and a negative pressure nozzle. The negative pressure nozzle is connected to the blower, the first air chamber, and the second air chamber and provides the first air chamber and the second air chamber with a negative pressure resulted from an air current fed into the negative pressure nozzle by the blower.

In the water lubrication air compression system provided by the invention, the air channel system further includes an air intake filter, an air intake regulation valve, a water vapor eliminator, and a ball valve. The air intake filter is connected to the air intake regulation valve. The air intake regulation valve is connected to the inlet end of the compressor. The water vapor isolation device is connected to the water vapor eliminator. The ball valve is connected to the water vapor eliminator.

In the water lubrication air compression system provided by the invention, the water channel system includes a first water treatment device, a second water treatment device, a cooler, a filter, a water pump, and a ball valve. The first water treatment device is connected to the external water source and the water vapor isolation device. The second water treatment device is connected to the water vapor isolation device. The water pump is connected between the second water treatment device and a first water inlet of the compressor. The cooler is connected between the second water treatment device and the filter. The ball valve is connected between the filter and a second water inlet of the compressor.

In the water lubrication air compression system provided by the invention, the first water treatment device can be a reverse osmosis devise or a water softener. The second water treatment device is a sacrificial anode treatment device.

In the water lubrication air compression system provided by the invention, the compressor is connected to a driver which drives the compressor to compress an air, entering from the inlet end, into a compressed air which is then discharged through the outlet end. The driver can be an electric motor, a pneumatic motor, or a turbine.

The water lubrication air compression system of the invention provides an additional external cooling structure for the lubrication structure of the compressor. The lubricant whose temperature rises during operation is cooled down by the cooling structure using circulation with heat dissipation, thereby enhancing the capacity and stability of the compressor. Also, the negative pressure system provides an environment of negative pressure for the sealing structure to effectively isolate the oil lubrication structure from the water lubrication structure without any possible inter-contamination therebetween.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and claims, the system components are differentiated not by their names but by their function and structure differences. In the following discussion and claims, the terms "include" and "comprise" are used in an open-ended fashion and should be interpreted as "include but is not limited to". Also, the term "couple" or "link" is intended to mean either an indirect or a direct mechanical or electrical connection. Thus, if a first device is coupled or linked to a second device, that connection may be through a direct mechanical or electrical connection, or through an indirect mechanical or electrical connection via other devices and connections.

Figure 1:
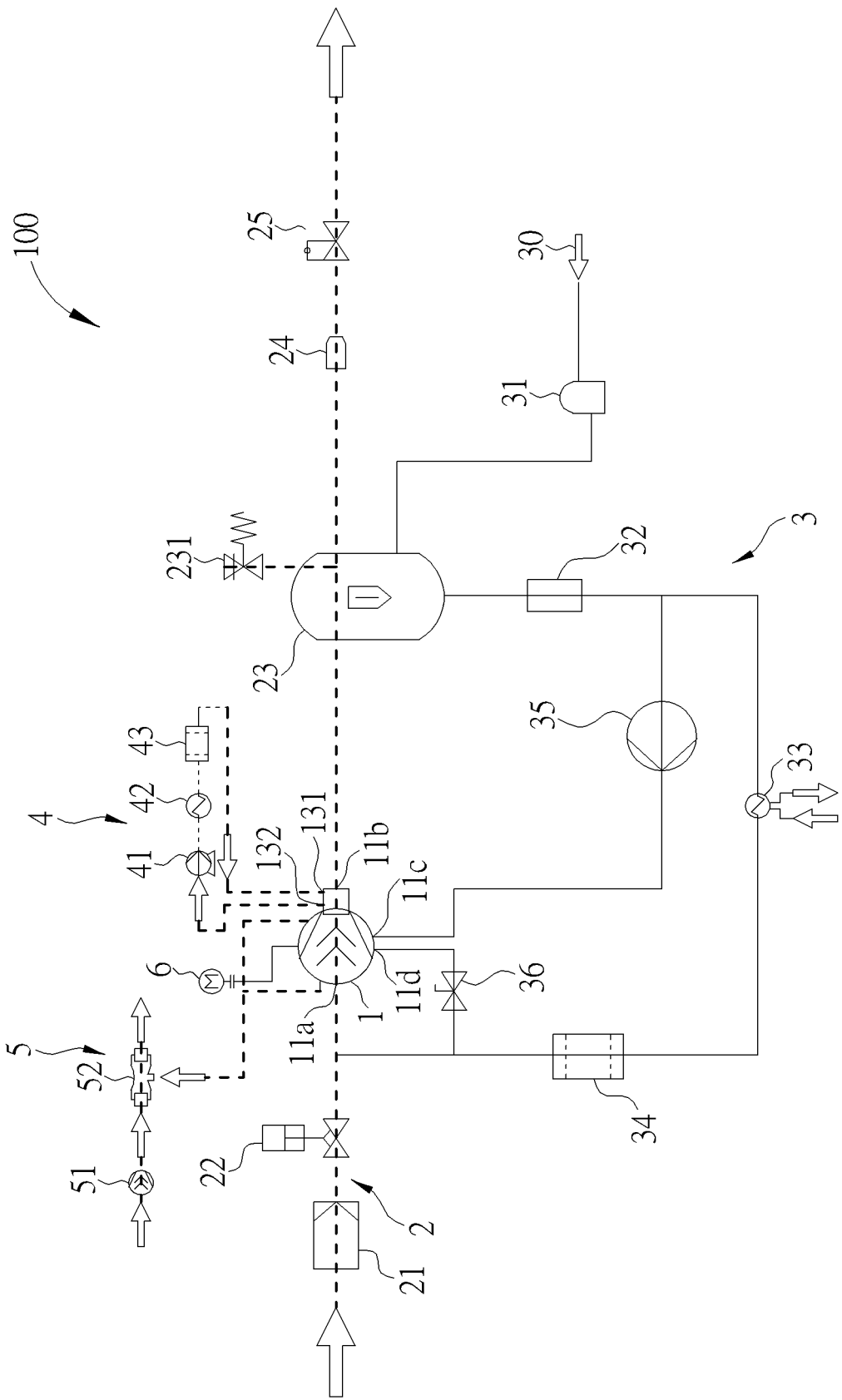
FIG. 1 is a schematic diagram showing an embodiment of the water lubrication air compression system of the invention.
Figure 2:
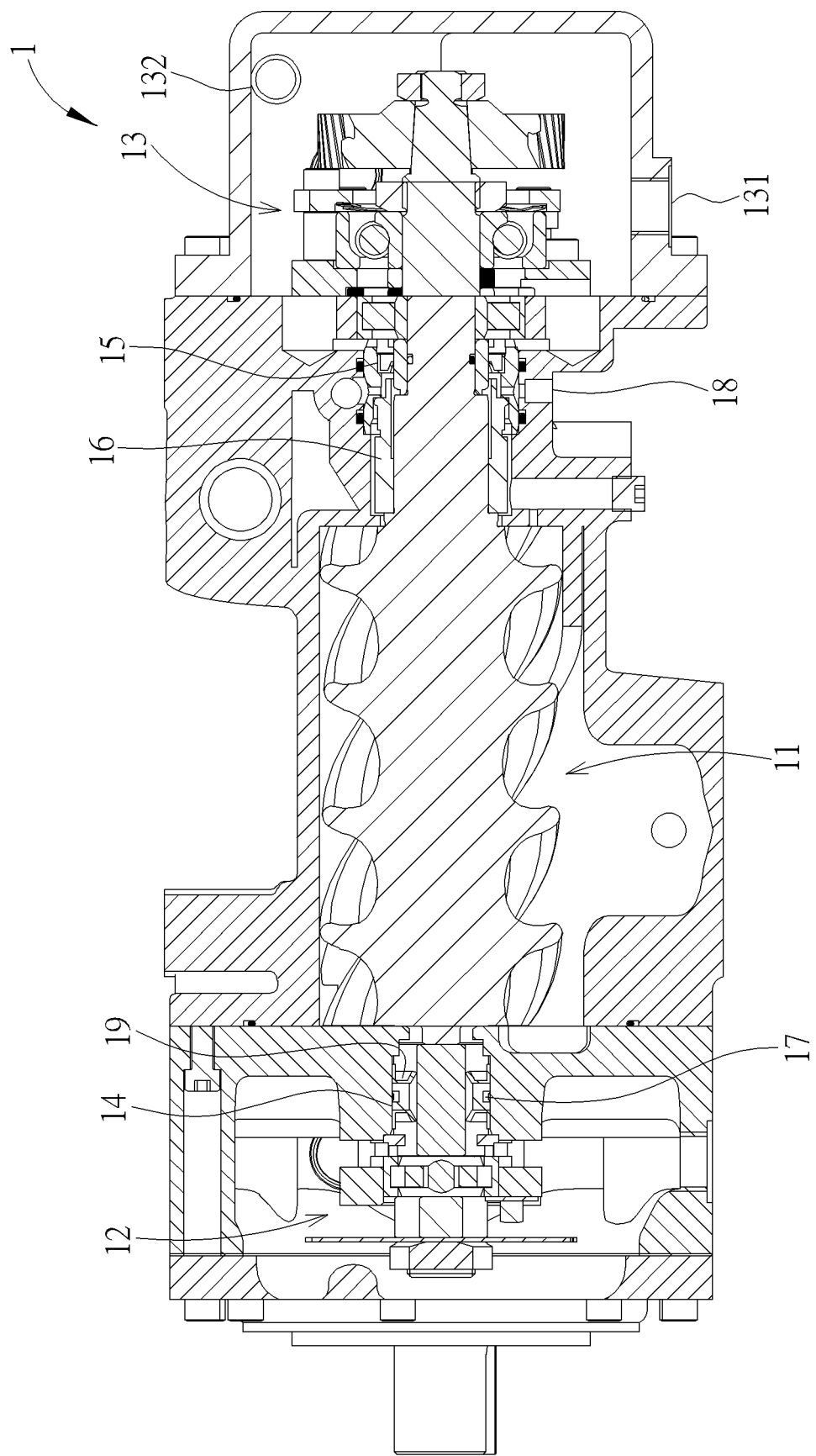
FIG. 2 is a schematic diagram showing a cross sectional drawing of an embodiment of the compressor of the water lubrication air compression system.

Please refer to FIG. 1 and FIG. 2. FIG. 1 is a schematic diagram showing an embodiment of the water lubrication air compression system of the invention. FIG. 2 is a schematic diagram showing a cross sectional drawing of an embodiment of the compressor of the water lubrication air compression system. The water lubrication air compression system 100 includes a compressor 1, an air channel system 2, a water channel system 3, a lubricant channel system 4, and a negative pressure system 5. The compressor 1 is a water lubrication compressor which mixes intake air and intake water into a mixture and compresses the mixture to a particular volume before ejection. The compressor 1 is connected to a driver 6, which can be an electric motor, a pneumatic motor, or a turbine in the embodiments of the invention. The driver 6 drives the compressor 1 to compress an air entered from the inlet end 11a of the compressor 1 into a compressed air which is then sent out through the outlet end 11b. As shown in FIG. 2, the compressor 1 includes a compression chamber 11, a first bearing chamber 12, and a second bearing chamber 13. A first air chamber 17 is positioned between and separates the first bearing chamber 12 and the compression chamber 11, and a first oil seal 14 is disposed to the first bearing chamber 12. A first sealing device 19 is disposed to the compressor 1 at a side of the compression chamber 11 adjacent to the first air chamber 17. A second air chamber 18 is positioned between and separates the second bearing chamber 13 and the compression chamber 11, and a second oil seal 15 is disposed to the second bearing chamber 13. A second sealing device 16 is disposed to the compressor 1 at a side of the compression chamber 11 adjacent to the second air chamber 18, where the second sealing device 16 can be mechanically in the form of a shaft seal or a lip seal.

The first bearing chamber 12 and the second bearing chamber 13 are lubricant containing tanks independent to each other, which lubricate rotor bearings of the compressor 1 during operation and are sealed against the longitudinal ends of the compression chamber 11 through the application of the first oil seal 14 and the second oil seal 15. The first bearing chamber 12 at the front end of the compression chamber 11 lubricates the rotor bearing and is sealed by the first oil seal 14 against the front end of the compression chamber 11 to avoid any oil vapor from entering the sealed compression chamber 11 and contaminating the compressed air. Further, a first sealing device 19 is disposed adjacently to the front end of the compression chamber 11. The second bearing chamber 13 at the rear end of the compression chamber 11 lubricates the rotor bearing and a synchronous gear. Besides deploying the second oil seal 15 for doing the same job of blocking the leakage of vaporized lubricant, a second sealing device 16 is further disposed adjacent to the rear end of the compression chamber 11 for blocking both the compressed air and the water vapor from entering the second bearing chamber 13, considering the second bearing chamber 13 is at the compressed high pressure air discharging end.

The air channel system 2, which provides communication between the inlet end 11a and the outlet end 11b of the compressor 11, includes an air intake filter 21, an air intake regulation valve 22, a water vapor isolation device 23, a water vapor eliminator 24, and a ball valve 25. The air intake filter 21 is connected to the air intake regulation valve 22 and the air intake regulation valve 22 is connected to the inlet end 11a of the compressor 1 to feed air into the compressor 1. The water vapor isolation device 23 is connected to the outlet end 11b of the compressor 1, where a pressure safety valve 231 can be appended to the water vapor isolation device 23. The water vapor eliminator 24 is connected to the water vapor isolation device 23 and the ball valve 25 is connected to the water vapor eliminator 24. Compressed air and water mixture is discharged by the compressor 1 from the outlet end 11b and travels through the water vapor isolation device 23, the water vapor eliminator 24, and the ball valve 25 all the way to cool down before discharged to a system end.

The water channel system 3 is connected between an external water source 30 and the inlet end 11a of the compressor 1. Specifically, the water channel system 3 includes a first water treatment device 31, a second water treatment device 32, a cooler 33, a filter 34, a water pump 35, and a ball valve 36. The first water treatment device 31 can be a reverse osmosis device or a water softener to adjust water quality of the external water source 30. The first water treatment device 31 is connected to the external water source 30 and the water vapor isolation device 23. The second water treatment device 32, connected to the water vapor isolation device 23, can be a sacrificial anode treatment device which adjusts concentration of metal ion in the isolated water to reduce corrosiveness therefrom to the components. The water pump 35 is connected between the second water treatment device 32 and the first water inlet 11c of the compressor 1 to help pressurize some water into the first water inlet 11c of the compressor 1 on system actuation when pressure is little or none. The cooler 33 is also connected between the second water treatment device 32 and the filter 34 and the ball valve 36 is connected between the filter 34 and the second water inlet 11d. Lubricant water is cooled down by the cooler 33, filtered by the filter 34 to remove any impurities in the circulating water with ensured purity, and then transported to the compression chamber 11 of the compressor 1 under the regulation of the ball valve 36. The water, fed into the compression chamber 11 of the compressor 1 via the first water inlet 11c and the second water inlet 11d in the water channel system 3, not just cools down the working components and the terminal shaft seals in the compression chamber 11 but also serves as lubrication and sealant, hence forming a complete circulating system.

As the compression system 100 is specified to work under high load, heat arises in the operation leads to the rise of temperature of the lubricant in the second bearing chamber 13. The lubricant channel system 4 is therefore configured to be connected to the second bearing chamber 13 for circulation and cooling of the lubricant therein. As shown in FIG. 1, the lubricant channel system 4 includes a lubricant pump 41, a lubricant cooler 42, and a lubricant filter 43. The second bearing chamber 13 includes a lubricant inlet 131 and a lubricant outlet 132 (as shown in FIG. 2), and the lubricant pump 41 is configured to be connected to the lubricant outlet 132 to pump the lubricant out of the second bearing chamber 13 and to transport the lubricant to the lubricant cooler 42 as a cooling site connected to the lubricant pump 41. The lubricant filter 34 is connected to the lubricant cooler 42 and the lubricant outlet 131, and the cooled down lubricant is filtered by the lubricant filter 34 before entering the second bearing chamber 13 through the lubricant inlet 131.

The negative pressure system 5 is connected to the first air chamber 17 and the second air chamber 18 respectively. The first air chamber 17 is positioned between the compression chamber 11 and the first bearing chamber 12 and the second air chamber 18 is positioned between the second bearing chamber 13 and the compression chamber 11. For the sake of avoiding possible water vapor leakage arising from the fatigue of the shaft seal in the compression chamber 11, the negative pressure system 5 utilizes a blower 51 connected to a negative pressure nozzle 52 that is further connected to the first air chamber 17 and the second air chamber 18. The negative pressure nozzle 52 is a flow channel with restricted cross sectional area, which serves to accelerate the passing air flow fed by the blower 51. Based on the Bernoulli's principle, the pressure level in the flow channel drops accordingly, which in turn provides negative pressure for the first air chamber 17 and the second air chamber 18. Therefore, any leakage water vapor from the compression chamber 11 (or any leakage lubricant vapor from the first bearing chamber 12 or the second bearing chamber 13) will be guided towards the negative pressure nozzle 52 and further discharged into the atmosphere, as shown in FIG. 1, by the negative pressure built within the negative pressure system 5 as the leakage of air or lubricant enters the first air chamber 17 or the second air chamber 18. In view of the mechanism above, the negative pressure system 5 is a suitable implementation providing the water lubrication air compression system 100 with active leakage proof means.

The water lubrication air compression system 100 of the invention introduces a heat dissipation lubricant channel system 4 connected to the second bearing chamber 13 situated at the high pressure side of the compressor 1. Circulated in the lubricant channel system 4 while dissipating heat, the lubricant with uprising temperature is cooled down to keep the compressor 1 in full capacity and stability. Also, the air chambers between where the oil and the water lubrications occur are implemented to be connected to the negative pressure system 5 and fed with a negative pressure. Any water vapor or oil vapor leakage occurring in the compression chamber 1 or the bearing chambers may be resolved with the negative pressure, which is provided by the negative pressure system 5 and exerted on the sealing structure. Therefore, the invention features effective isolation between oil lubrication and water lubrication without any possible inter-contamination therebetween.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A water lubrication air compression system comprising:
    a compressor comprising an inlet end, an outlet end, a compression chamber, a first bearing chamber, a second bearing chamber, a first air chamber between the first bearing chamber and the compression chamber, and a second air chamber between the second bearing chamber and the compression chamber;
    an air channel system connected between the inlet end and the outlet end of the compressor, the air channel system comprising a water vapor isolation device connected to the outlet end of the compressor;
    a water channel system connected between an external water source and the inlet end of the compressor;
    a lubricant channel system connected to the second bearing chamber where a lubricant in the second bearing chamber is circulated in the lubricant channel system; and
    a negative pressure system connected to the first air chamber and the second air chamber and providing a negative pressure for the first air chamber and the second air chamber, the negative pressure system comprising:
    a blower; and
    a negative pressure nozzle connected to the blower, the first air chamber, and the second air chamber, the negative pressure nozzle providing the first air chamber and the second air chamber with a negative pressure resulted from an air current fed into the negative pressure nozzle by the blower.

2. The water lubrication air compression system of claim 1, wherein the first bearing chamber comprises a first oil seal, the second bearing chamber comprises a second oil seal, and the compressor comprises a first sealing device at a side of the compression chamber adjacent to the first air chamber and the first bearing chamber and comprises a second sealing device at a side of the compression chamber adjacent to the second air chamber and the second bearing chamber.

3. The water lubrication air compression system of claim 1, wherein the second bearing chamber comprises a lubricant inlet and a lubricant outlet and the lubricant channel system comprises:

a lubricant pump connected to the lubricant outlet of the second bearing chamber;

a lubricant cooler connected to the lubricant pump; and a lubricant filter connected to the lubricant cooler and the lubricant inlet of the second bearing chamber, wherein the lubricant in the second bearing chamber is pumped out of the lubricant outlet by the lubricant pump, cooled by the lubricant cooler, and filtered by the lubricant filter before entering the second bearing chamber through the lubricant inlet.

4. The water lubrication air compression system of claim 1, wherein the air channel system further comprises an air intake filter, an air intake regulation valve, a water vapor eliminator, and a ball valve, wherein the air intake filter is connected to the air intake regulation valve, the air intake regulation valve is connected to the inlet end of the compressor, the water vapor isolation device is connected to the water vapor eliminator, and the ball valve is connected to the water vapor eliminator.

5. The water lubrication air compression system of claim 1, wherein the water channel system comprises a first water treatment device, a second water treatment device, a cooler, a filter, a water pump, and a ball valve;

wherein the first water treatment device is connected to the external water source and the water vapor isolation device, the second water treatment device is connected to the water vapor isolation device, the water pump is connected between second water treatment device and a first water inlet of the compressor, the cooler is connected between the second water treatment device and the filter, and the ball valve is connected between the filter and a second water inlet of the compressor.

6. The water lubrication air compression system of claim 5, wherein the first water treatment device is selected from the group composed of a reverse osmosis devise and a water softener, and the second water treatment device is a sacrificial anode treatment device.

\* \* \* \* \*